United States Patent [19]
Mills et al.

[11] Patent Number: 5,854,620
[45] Date of Patent: Dec. 29, 1998

[54] METHOD AND APPARATUS FOR CONVERTING MONOCHROME PIXEL DATA TO COLOR PIXEL DATA

[75] Inventors: Karl Scott Mills, Lynnwood; Jeffrey Michael Holmes, Seattle; Mark Emil Bonnelycke, Seattle; Richard Charles Andrew Owen, Seattle, all of Wash.

[73] Assignee: Cirrus Logic, Inc., Fremont, Calif.

[21] Appl. No.: 574,502

[22] Filed: Dec. 19, 1995

[51] Int. Cl.⁶ .................................................. G09G 5/04
[52] U.S. Cl. .......................................... 345/153; 345/155
[58] Field of Search .................................. 345/150, 153, 345/154, 155; 358/518, 523, 519; 382/162, 167, 232

[56] References Cited

U.S. PATENT DOCUMENTS

| | | | |
|---|---|---|---|
| 5,172,221 | 12/1992 | Ko | 358/61 |
| 5,251,298 | 10/1993 | Nally | 395/166 |
| 5,294,918 | 3/1994 | Preston et al. | 345/155 |
| 5,317,420 | 5/1994 | Kuwahara | 358/463 |
| 5,345,320 | 9/1994 | Hirota | 358/518 |
| 5,389,947 | 2/1995 | Wood et al. | 345/145 |
| 5,402,513 | 3/1995 | Schafer | 382/47 |
| 5,410,250 | 4/1995 | Brown | 324/309 |
| 5,420,938 | 5/1995 | Funada et al. | 382/173 |
| 5,446,843 | 8/1995 | Fucito et al. | 395/250 |

*Primary Examiner*—Regina Liang
*Attorney, Agent, or Firm*—Robert P. Bell; Steven A. Shaw

[57] ABSTRACT

A graphics controller circuit for converting a plurality of monochrome pixel data into a corresponding set of color pixel data in RGB 888 format. The graphics controller circuit packs the converted color pixel data into a plurality of 64-bit color pixel words, with each color pixel word comprising two complete color pixel words and portion of at least one another color pixel word. By having color pixel data cross word boundaries, graphics controller of the present invention optimally stores color pixel data in color pixel words. The graphics controller circuit further includes a half-word addressable split-RAM which enables continuous availability of subsets of monochrome pixel data during each clock cycle for conversion to color data.

20 Claims, 6 Drawing Sheets

METHOD AND APPARATUS FOR CONVERTING MONOCHROME PIXEL DATA TO COLOR PIXEL DATA

CROSS-REFERENCE TO RELATED APPLICATIONS

The present application claims priority from Provisional application Ser. No. 06/000,490 entitled "Byte Enable FIFO Architecture" filed Jun. 23, 1995.

1. Field of the Invention

The present invention relates generally to computer graphics systems and more specifically to a method and apparatus for converting monochrome pixel data to color pixel data in a graphics controller chip.

2. Background of the Invention

Computer systems may display input monochrome signals on color display monitors. Such input monochrome signals may comprise several black and white pixels, with each pixel being represented by a logical bit. To display input monochrome signals on color monitors, a computer system may convert monochrome pixel data to a corresponding color pixel data. For example, a computer system may convert each logical bit of a monochrome signal to a color pixel datum in RGB 888 format. The computer system may then generate color display signals to a color display monitor based on the converted color pixel data.

Computer systems may store such converted color pixel data in a local memory before generating display signals. Word-width in such local memory may not be designed to optimally store multiple color pixel data as number of bits in such local memory may not be an exact multiple of number of bits used for representing each color pixel data as illustrated in FIG. 1.

In FIG. 1, monochrome pixel byte 110 may comprise eight bits 111–118, with each bit representing a monochrome pixel. Memory word 120 may comprise eight bytes 121–128 for storing color pixel data converted in RGB 888 format. As will be appreciated, memory word 120 may store only two complete color pixel data in bytes 123–128 as each color pixel datum comprises three bytes or twenty four bits. The remaining two bytes 121–122 may not include sufficient bits to store another complete color pixel datum.

A prior computer system may store only two color pixel data in each memory word 120 as memory word 120 may not include sufficient number of bits to store a third color pixel datum. Such a storage scheme may not optimally utilize all bytes available in memory word 120 as two of the eight bytes in each memory word may be unused. Such a computer system may need to employ larger memories because of such under-utilized storage scheme, thereby increasing cost of the overall computer system.

In addition, while transferring color pixel data in memory words on computer buses, bandwidth on the computer buses may also not be efficiently utilized as data stored in the unused bytes may also be transferred along with color pixel data. Such inefficient utilization of bandwidth may lead to bottlenecks on computer system buses, thereby hindering throughput performance of overall computer systems.

SUMMARY AND OBJECTS OF THE INVENTION

A graphics controller circuit includes a memory interface circuit for receiving a plurality of monochrome pixel data, and a convertor for converting the plurality of monochrome pixel data into a corresponding set of color pixel data. The converter packs a plurality of color pixel data into a plurality of color pixel words wherein one portion of a first color pixel data is stored in a first color pixel word and another portion of the first color pixel data is stored in a second color pixel word. Each color pixel word in the present invention may comprise 64 bits and each color pixel data may comprise 24 bits.

By storing color pixel data (such as the first color pixel) across two color pixel words, the graphics controller circuit packs eight 24-bit color pixel data into three 64-bit words. In contrast, in prior art, four 64-bit words may be required to store the eight 24-bit color pixel data. Hence, the graphics controller circuit of the present invention requires less memory to store the color pixel data in comparison to prior art graphics controller circuits.

Another aspect of the present invention includes generating a 64-bit color pixel word per clock cycle by converting a subset of color pixel data during each corresponding clock cycle. Such an output rate may be made possible by a memory comprising a plurality of data units for storing the stream of monochrome pixel data. A register may be coupled to the memory for storing at least two data units of the stream of monochrome pixel data.

The graphics controller circuit may further include a convertor coupled to receive at least the two data units of the stream of monochrome pixel data stored in the register. The converter converts a successive subset of the stream of monochrome pixel data to a corresponding set of color pixel data during a corresponding successive clock cycle. A state machine generates control signals to the memory and the register to cause the register to replace a first data unit of the two data units of monochrome pixel data with a subsequent data unit of monochrome pixel data in the memory after the convertor completes generating color pixel data from the first data unit.

By replacing a data unit in the register with a subsequent data unit in the memory, the convertor may have available in the register during each successive clock cycle the corresponding subset of stream of monochrome pixel data required to generate corresponding color pixel word in that clock cycle. Hence, the control state machine, the memory and the register may provide to the converter each subset of bits required for generating color pixel data word in each clock cycle.

The memory of the present invention comprises a half-word addressable split RAM comprising a plurality of words, and wherein the data unit comprises a half-word. The convertor may comprise a multiplexor coupled to the register to receive the at least two half-words of monochrome pixel data stored in the register circuit. The multiplexor may selectively forward the subset of monochrome pixel data during each clock cycle under the control of the state machine. The convertor may also include a color pixel data generator for generating a color pixel data corresponding to each of the subset of monochrome pixel data.

The graphics controller circuit of the present invention further comprises a rasterop unit which receives the color pixel words and executes raster operations on the color pixel data in the color pixel words. As the color pixel words include more number of color pixel data per a given number of color pixel words than in the prior art, the performance output of the rasterop unit may be enhanced.

BRIEF DESCRIPTIONS OF THE DRAWINGS

DETAILED DESCRIPTION OF THE PRESENT INVENTION

Figure 2:
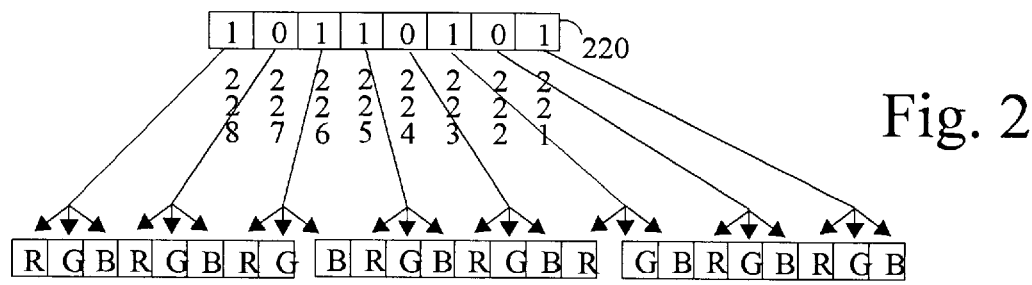
FIG. 2 is a diagram of a monochrome pixel data byte and three color pixel data words wherein color pixel data corresponding to the monochrome pixel data is stored in a packed format.
Figure 4:
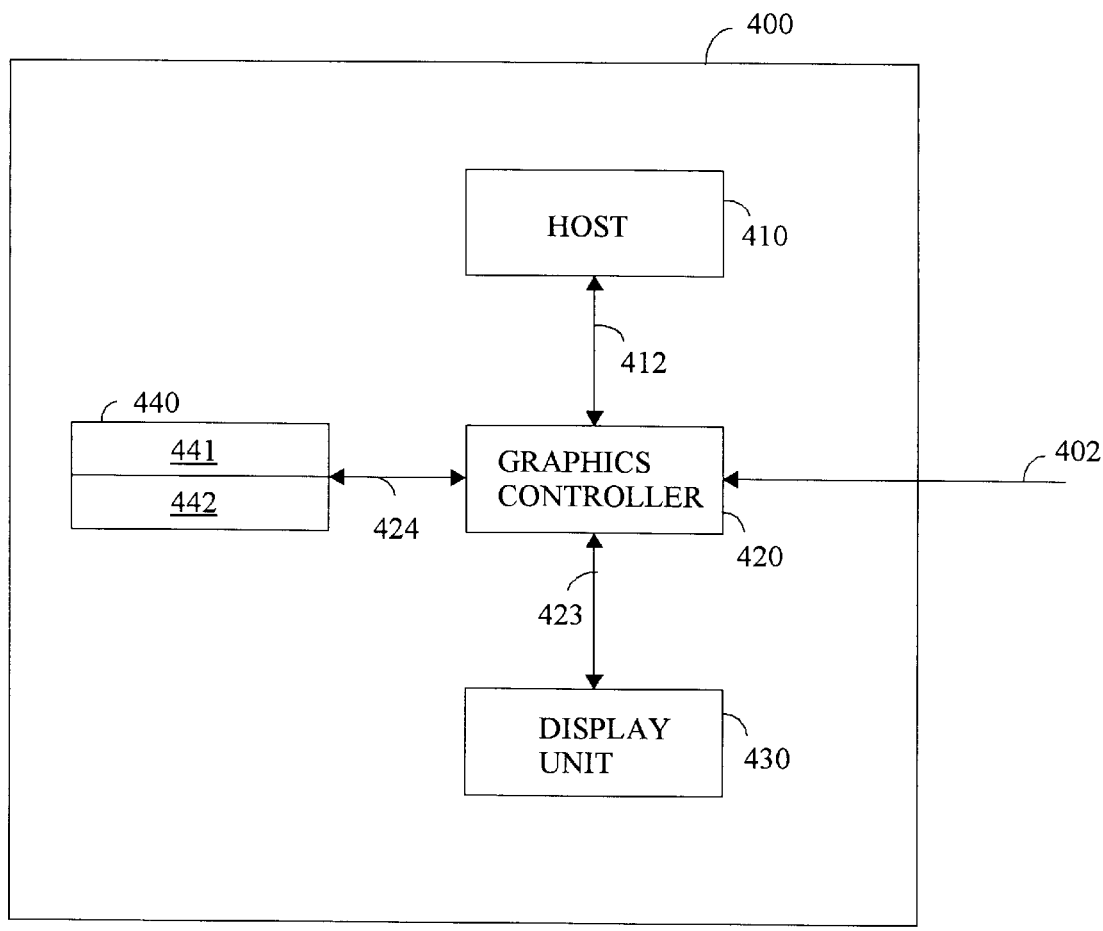
FIG. 4 is a block diagram of a computer system of the present invention comprising a host, a graphics controller circuit, a display memory and a display unit.

The present invention is described in the context of a graphics controller chip 420 (shown in FIG. 4) which packs color pixel data in RGB 888 format into memory words as shown in FIG. 2 to efficiently utilize storage bits in display memory 440 (shown in FIG. 4). In FIG. 2, color pixel data (in RGB 888 format) corresponding to eight monochrome pixel bits 221–228 are shown packed in three color pixel words 230, 240, and 250 with color pixel data corresponding to bits 223 and 226 crossing word boundaries. Due to such word boundary crossing, graphics controller 420 of the present invention requires lesser number of color pixel words to store color pixel data.

Graphics controller chip 420 of the present invention may also employ memory interface circuit 509 (shown in FIG. 5) which provides a subset of monochrome pixel data during each clock cycle, which enables converter 521 (shown in FIG. 5) to generate a color pixel word per clock cycle. Memory interface circuit 509 of the present invention may include a split SRAM 510 and register 511 which together operate to provide the subset of monochrome pixel data even when the subset is stored across two monochrome pixel data.

FIG. 4 is a block diagram of a computer system 400 of the present invention comprising host 410, graphics controller 420, display memory 440 and display unit 430. Graphics controller 420 receives monochrome pixel data of a video image as input from either host 410 over system bus 412 or from an external device (not shown) such as video signal encoder over video port 402. Monochrome pixel data may be received in a scan line dominant order, i.e., pixel data corresponding to pixels on a scan line may be received consecutively before receiving pixel data for a subsequent scan line. Graphics controller 420 may store monochrome pixel data in off-screen portion 441 of display memory 440 over memory bus 424.

Graphics controller 420 converts input monochrome pixel data into color pixel data and packs the color pixel data into 64-bit words as shown in FIG. 2. In FIG. 2, eight bits of monochrome pixel data is shown stored in bits 221–228 of byte 220. Graphics controller 420 packs the color pixel data corresponding to monochrome pixel data as shown in color pixel words 230, 240 and 250. Each color pixel word stores two complete color pixel data, and part of at least one another color pixel data. For example, color pixel word 230 stores color pixel data corresponding to monochrome pixel data in bits 221 and 222, and GB components of monochrome pixel data in bit 223. Color pixel word 240 stores color pixel data of monochrome pixel bits 224 and 225, R component of bit 223 and B component of bit 226.

Graphics controller 420 may store data in color pixel words 230, 240 and 250 in frame buffer area 442 of display memory 440 over memory bus 424. Graphics controller 420 may retrieve color pixel data from frame buffer area 442 over memory bus 424, and then generate control signals from the color pixel data to display unit 430 to display video image corresponding to input monochrome pixel data.

As the color pixel data is packed into 64-bit words, the words may not contain any unused data. As such packed words are transferred over memory bus 442, bandwidth on memory bus 442 is efficiently utilized. In addition, memory in display memory 440 may also be more efficiently utilized due to such packed pixels.

Figure 5:
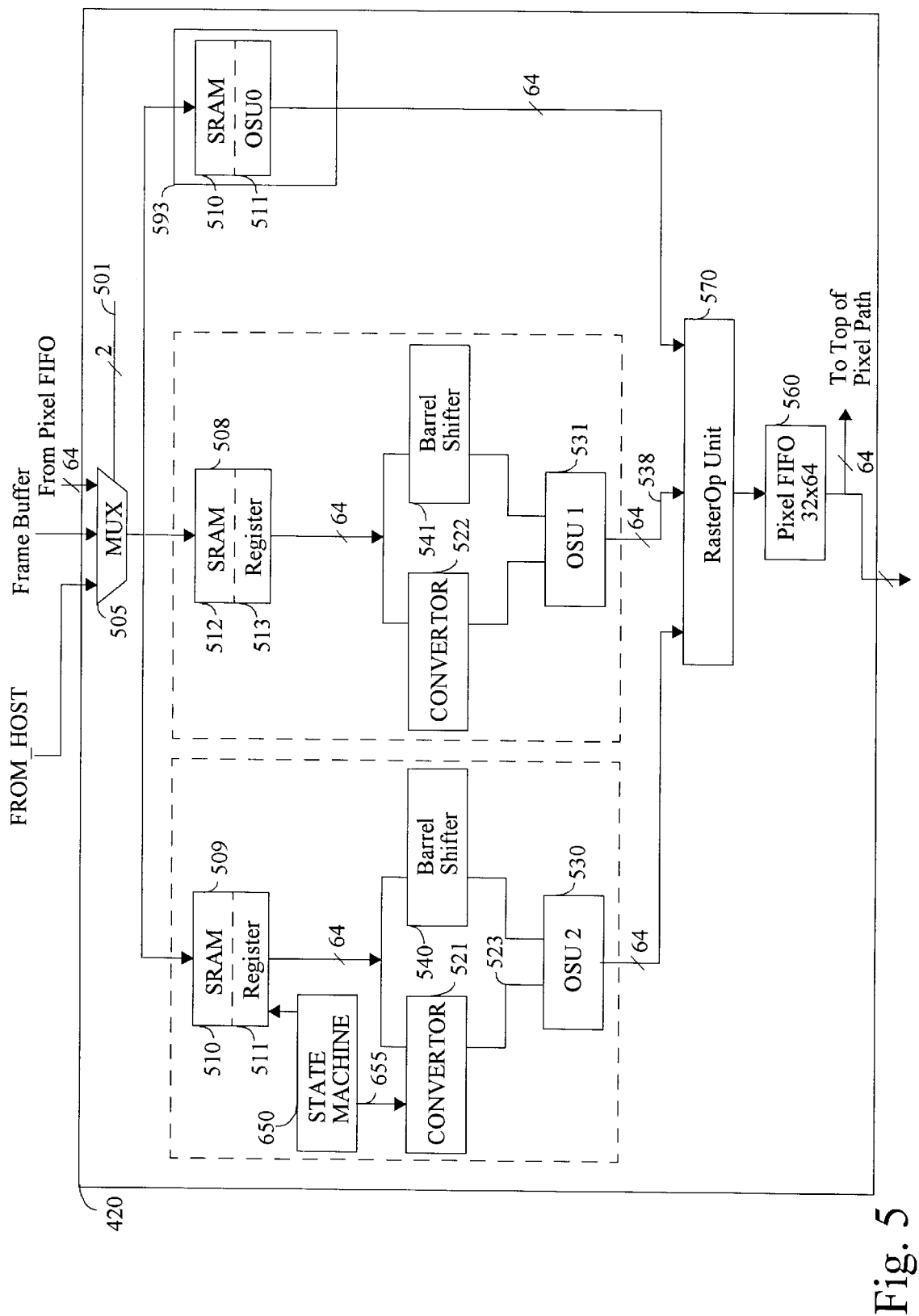
FIG. 5 is a block diagram of the graphics controller of the present invention comprising a convertor which converts monochrome pixel data into color pixel data, and a memory interface circuit comprising an SRAM and a register.

FIG. 5 is a block diagram of graphics controller 420 of the present invention which converts monochrome pixel data into color pixel data. Graphics controller 120 may execute graphics operations with up to four operands, and may comprise three parallel pipelines 591–593 to process the operands. Pipelines 591 and 592 (corresponding to Op2 and Op1 respectively) may include converters 521 and 522 respectively to convert monochrome pixel data to color pixel data in accordance with the present invention. Operands Op0, Op1 and Op2 may specify destination, source and pattern respectively for a raster operation.

Multiplexor 505 may receive either color or monochrome pixel data from one of host 410, display memory 440 or pixel FIFO 560, and route the pixel data to one of the three pipelines 591–593 according to a signal on SRAM-select signal 501. Multiplexor 505 may receive up to 128 bytes of data in a single burst transfer, and forward the data to one of the three pipelines 591–593. Pipeline 592 may operate similar to pipeline 592 and in the interest of conciseness, the present invention is hereinafter explained with reference to pipeline 591.

Pipeline 591 may comprise memory interface circuit 509, converter 521, barrel shifter 540 and operand storage unit 2 (OSU2) 530 for processing operand 2 of each graphics operation. Memory interface circuit 509 receives data from multiplexor 505, and provides a subset of monochrome pixel data bits (for example bits 221–223 of FIG. 2) required for generating a corresponding color pixel word (for example color pixel word 230 of FIG. 2) during a clock cycle.

Memory interface circuit 509 may comprise SRAM 510 for storing bytes received from multiplexor 505, and a register 511 for storing two half-words from SRAM 510 and providing the subset of bits required for generating color pixel word from the two half-words to convertor 521. Register 511 and SRAM 510 operate to store subset of bits during a clock cycle even though the subset of bits may be located in two different monochrome pixel words.

If pixel data received comprises monochrome pixel data, SRAM 510 and register 511 of the present invention together operate to provide monochrome pixel data to converter 521. SRAM 510 and register 511 may provide 64-bits of color pixel data to barrel shifter 540 if the pixel data comprises color data.

Converter 521 of the present invention converts monochrome pixel data into color pixel data, packs the color pixel data into 64-bit words, and sends a 64-bit word during each clock cycle to operand storage unit 2 (OSU2) 530. The format of packed 64-bit pixel data resulting from operation of convertor 521 is illustrated in FIG. 2.

In FIG. 2, three 64-bit color pixel words (230, 240 and 250) resulting from conversion of eight bits (221–228) of monochrome pixel data byte 220 into RGB 888 format are shown. Least significant bit 221 of monochrome pixel data byte 220 is shown converted to three bytes 230, 240 and 250. Similarly, each of the other bits 222–228 in monochrome pixel data byte 220 is shown converted to three bytes.

Continuing with reference to FIG. 5 again, convertor 521 generates a 64-bit color data word during each clock cycle and forwards the color data word to OSU2 530. Although the operation of convertor 521 is explained with reference to RGB 888 format, it will be appreciated that converter 521 of the present invention may convert monochrome pixel data into format other than RGB 888 without departing from the scope and spirit of the present invention.

Barrel shifter 540 may rotate color pixel data received from register 511 for required alignment. For example, if a required pixel data is located from bit position 8, barrel shifter 540 may shift color pixel data by eight positions (corresponding to bits 0–7) to position the required pixel data starting with least significant bit. Barrel shifter 540 forwards rotated color pixel data to OSU2 530.

Second pipeline 592 (to process operand 1) comprising SRAM 512, register 513, convertor 522, and barrel shifter 541 may operate similar to first pipeline 591, and store a 64-bit word for operand 1 in OSU1 531 during each clock cycle. SRAM 514 may provide Operand 0 to OSU0 532.

Rasterop unit 570 may receive source, destination, and pattern operands from OSU1 531, OSU0 532 and OSU2 530 respectively, and execute a raster operation to generate pixel data. The raster operation may comprise, for example, a boolean logical operation of all or a subset of the three operands. Some raster operations may require less than three operands, in which case operand output of a corresponding OSU may not be used. Raster operation code, which specifies a type of logical operation to be performed on the operands, may be specified by a register in graphics controller 420.

Pixel FIFO 560 may receive from rasterop unit 570 pixel data resulting from execution of raster operations. Pixel FIFO 560 may store the received pixel data in frame buffer area 442 over memory bus 424. To perform a raster operation with four operands, pixel FIFO 560 may send pixel data generated by rasterop unit 570 to multiplexor 505 as an operand for a subsequent iteration.

As convertors 521 and 522 generate color pixel data in a packed format (shown in FIG. 2), bandwidth on internal buses (for example 523, 537, 538 and 526) in graphics controller 420 is efficiently utilized, thereby avoiding potential bottlenecks on such internal buses.

Figure 1:
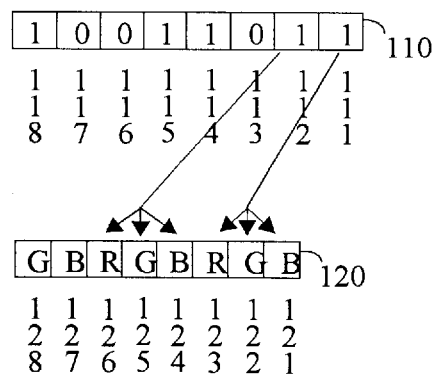
FIG. 1 is a diagram of a monochrome pixel data byte and a color pixel data word illustrating a situation wherein color pixel data word-width may not be designed to optimally store multiple color pixel data in the color pixel data word.

In addition, rasterop unit 570 may execute rasterops more efficiently as more useful data is received in the 64-bit operands. In prior art systems, two of eight bytes received may comprise unused data as explained with reference to FIG. 1, and rasterop unit 570 may accordingly have less useful data to operate with.

Figure 6:
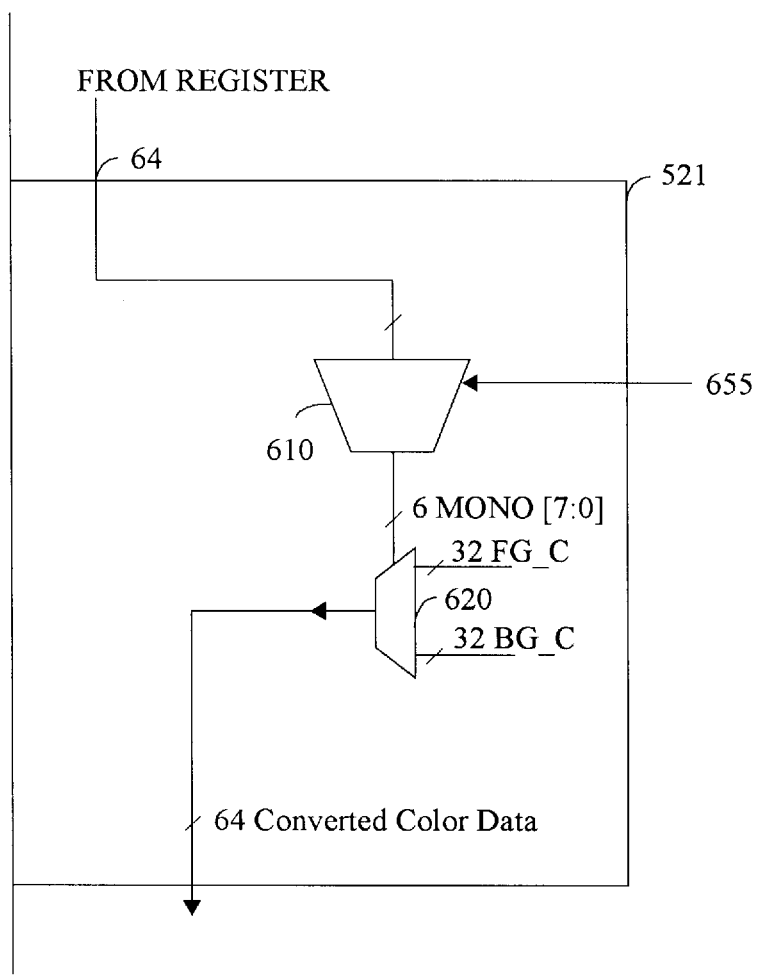
FIG. 6 is a block diagram of the convertor of the present invention comprising a multiplexor and a color pixel data generator.

FIG. 6 is a block diagram of convertor 521 of the present invention comprising state machine 650, multiplexor 610 and color-pixel data generator 620. State machine 650 may generate control signals to multiplexor 610 and color-pixel generator 620 to generate color pixel data as shown in FIG. 7.

Multiplexor 610 may receive input monochrome pixel data on a 64-bit bus 557 and selectively send a subset of the 64-bits to color-pixel data generator 620. Color pixel data generator 620 receives as input foreground color data on FG-color 621, background color data on BG-color 622 and the subset of bits on line 612. Color pixel data generator 620 generates 64-bits of packed color pixel data (shown in FIG. 2) from the inputs.

Figure 7:
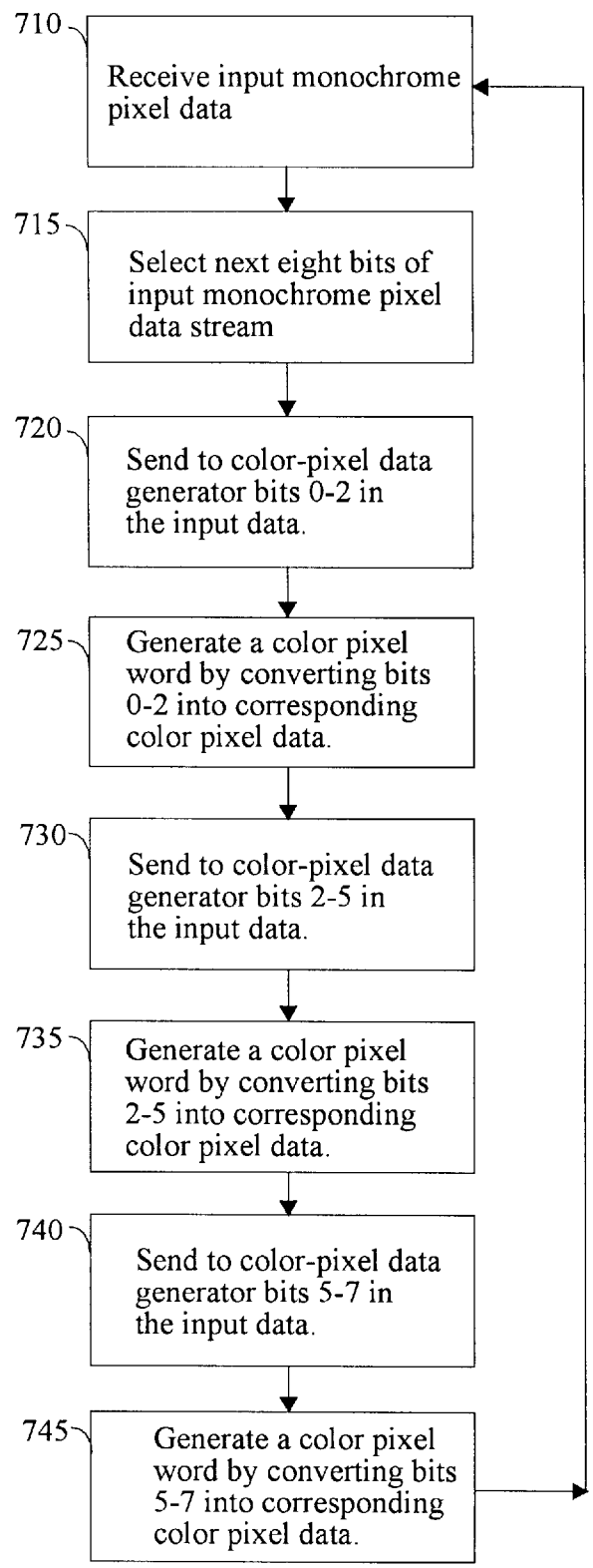
FIG. 7 is a flow-chart illustrating the steps performed by the graphics controller circuit in generating color pixel data words from monochrome pixel data.

FIG. 7 is a flow-chart illustrating the operation of convertor 521 in generating color pixel data from monochrome pixel data. The flow-chart illustrates conversion of eight bits of monochrome pixel data into corresponding eight color pixel data in a RGB 888 format. The eight color pixel data are stored in three 64-bit words.

Continuing with reference to FIGS. 6 and 7, multiplexor 610 may receive input monochrome pixel data in step 710. In step 715, state machine 650 may generate control signals to select eight bits of the stream of monochrome pixel data (possibly crossing word boundaries). Such eight may comprise the next bits to be converted in the input stream of monochrome pixel data. During a first iteration, the eight bits may correspond to the first eight bits in the input monochrome pixel stream. During subsequent iterations, successive eight bits of monochrome pixel data may be selected.

In step 720, state machine 650 generates control signals on bus 651 to cause multiplexor 610 to send to color-pixel data generator 620 first three bits (For example, bits 221–223 of FIG. 2) in the 64-bit input data.

In step 725, state machine 650 generates control signals on bus 652 to cause color-pixel data generator 620 to convert the first three bits into corresponding color pixel data. For conversion of each monochrome pixel data bit, color-pixel data generator 620 selects either the foreground color data or the background color depending on whether the monochrome pixel data bit represents a logical 1 or 0. Color-pixel data generator 620 may generate a 64-bit word comprising all RGB bytes corresponding to two monochrome pixel bits and only GB bytes corresponding to the third monochrome pixel bit as shown in word 230 of FIG. 2.

In step 730, state machine 650 generates control signals on bus 651 to cause multiplexor 610 to send to color-pixel data generator 620 bits 2–5 (For example, bits 223–226 of FIG. 2) in the 64-bit input data. In step 735, state machine 650 generates control signals on bus 652 to cause color-pixel data generator 620 to convert bits 2–5 into corresponding color pixel data. Color-pixel data generator 620 may generate a 64-bit word comprising R byte for bit 2, all RGB bytes for bits 3–4, and B byte for bit 5 as shown in word 240 of FIG. 2.

In step 740, state machine 650 generates control signals on bus 651 to cause multiplexor 610 to send to color-pixel data generator 620 bits 5–7 (For example, bits 226–228 of FIG. 2) in the 64-bit input data. In step 745, state machine 650 generates control signals on bus 652 to cause color-pixel data generator 620 to convert bits 5–7 into corresponding color pixel data. Color-pixel data generator 620 may generate a 64-bit word comprising RG bytes for bit 5, and all RGB bytes for bits 6–7 as shown in word 250 of FIG. 2.

Color-pixel data generator 620 may comprise combinational logic circuitry to generate color pixel data from the subset of 64-bits received from multiplexor 610, and may therefore generate 64-bits of converted pixel data in packed format in a single clock cycle. If multiplexor 610 provides continuous stream of subset of bits every clock cycle according to diagram in FIG. 7, color-pixel data generator 620 may in response generate 64-bits of color pixel data every clock cycle.

Convertor 521 repeats steps 715–745 for each of subsequent 8-bit monochrome pixel data in the input monochrome pixel data stream. For each such 8-bit monochrome pixel data, convertor 521 may generate three 64-bit color pixel data words. Convertor 521 may therefore generate a 64-bit color pixel data during each clock cycle. Convertor 620 may provide a 64-bit word per clock cycle to OSU2 530 which may send the 64-bit data to rasterop unit 570 for performing a raster operation. Convertor 522 may also operate similar to convertor 521.

By packing color pixel data in the packed manner shown in FIG. 2, convertor 521 of the present invention may generate a greater number of color pixel data during each clock cycle.

Although the operation of convertor 521 is explained with reference to conversion to RGB 888 format, it will be appreciated that convertor 521 may convert monochrome pixel data to a different color format. For example, convertor 521 may convert each input monochrome pixel datum to 8-bit color data format. In such a case, multiplexor 610 may send eight bits of monochrome pixel data during each clock cycle, and color-pixel data generator 620 may convert the eight bit monochrome pixel data into 64-bit color pixel data.

For color-pixel data generator 620 to generate 64-bit color data words at a rate of one word per clock cycle, multiplexor 610 may need to provide corresponding subset of bits at the same rate. In a conversion scheme wherein color pixel datum for a pixel may cross a word boundary (for example, when converting to RGB 888 format according to flow-chart in FIG. 7), such subset of monochrome pixel data may also cross 64-bit input data word as shown in FIG. 3, and multiplexor 610 may need to access bits from more than one 64-bit words to generate the subset of bits required for color conversion.

To provide access to such multiple 64-bit words of input monochrome pixel data to multiplexor 610, graphics controller 420 of the present invention employs a split SRAM 510 which provides access to half-words (i.e., 32 bits of 64-bit word). Such ability to access half-words enables multiplexor 610 to provide the required subset of monochrome pixel data bits consistently during each clock cycle as explained with reference to FIG. 8.

Figure 3:
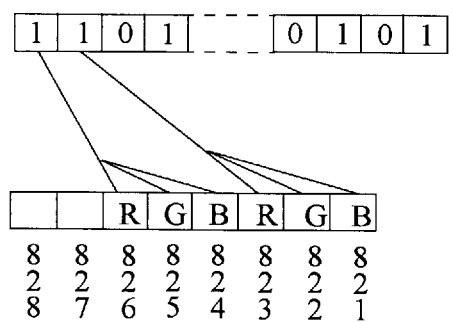
FIG. 3 is a diagram of a monochrome pixel data and corresponding color pixel data words illustrating a situation wherein the monochrome pixel data from two monochrome words may be required to generate a corresponding color pixel word during a clock cycle in accordance with the present invention.

FIG. 3 illustrates a situation wherein multiplexor 610 requires access to two 64-bit words to generate the subset of bits necessary for color-pixel data generator 620 to generate 64 bits of output color pixel data word. As will be appreciated, input monochrome pixel data may be stored across multiple words in frame buffer area 542, and such input monochrome pixel data may be stored starting from an intermediate bit within a memory word. Because of such storing, multiplexor 610 may require access to two 64-bit words to generate the subset of monochrome pixel bits for multiplexor 610 to convert to color pixel data.

Monochrome pixel data word 810 comprises 64 bits of monochrome pixel data. Bits 62 and 63 of monochrome pixel data word 810 are shown converted into color pixel bytes 821–823 and 824–826 of color pixel data word 820. To generate color pixel data for the remaining two bytes 827–828 of color pixel data word 820, color-pixel data generator 620 requires a bit of a subsequent monochrome pixel data word 830. As it is an object of the present invention to generate 64 bits of color pixel data per clock cycle, multiplexor 610 may need access to monochrome pixel data word 830 also to provide bits 62 and 63 of monochrome pixel data word 810, and bit 0 of monochrome pixel data word 830 in one clock cycle to color-pixel data generator 620.

Figure 8A:
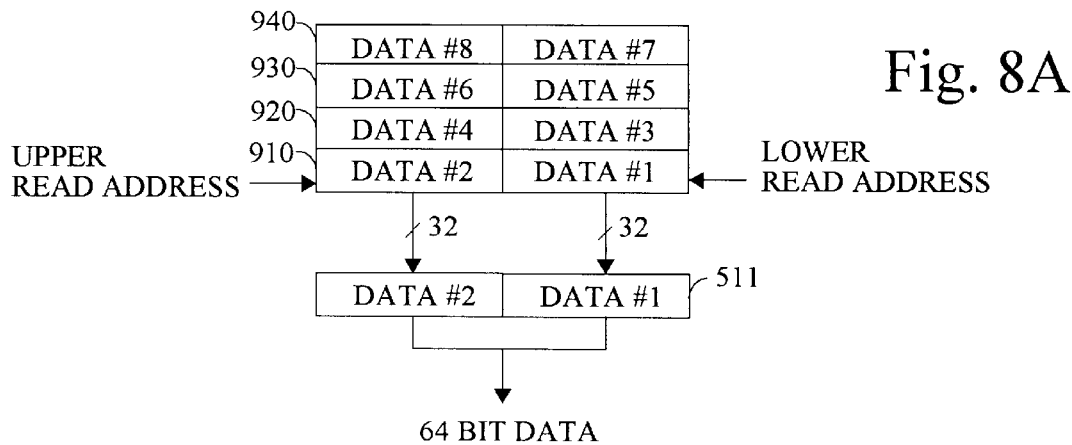
FIGS. 8A, 8B and 8C illustrate architecture and operation of the SRAM and the register of the present invention that enables access of bits located in two monochrome pixel data words to the multiplexor during a single clock cycle.
Figure 8B:
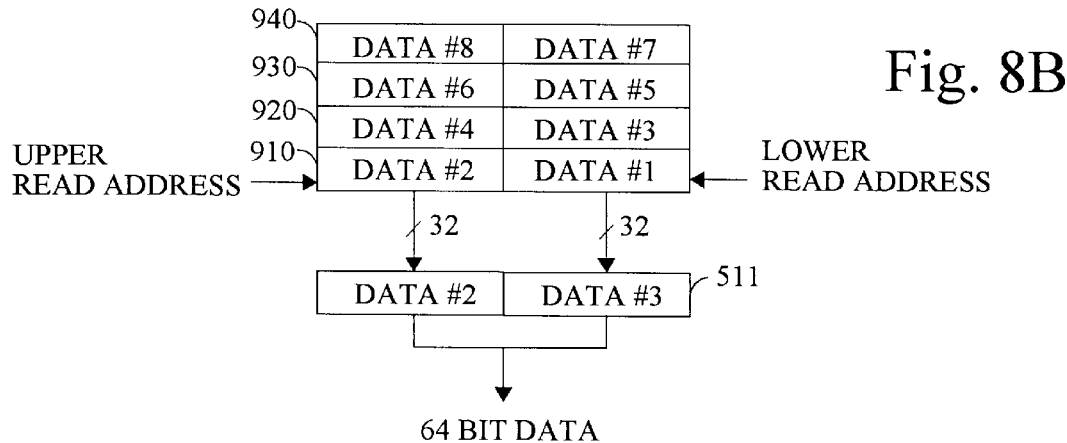
Figure 8C:
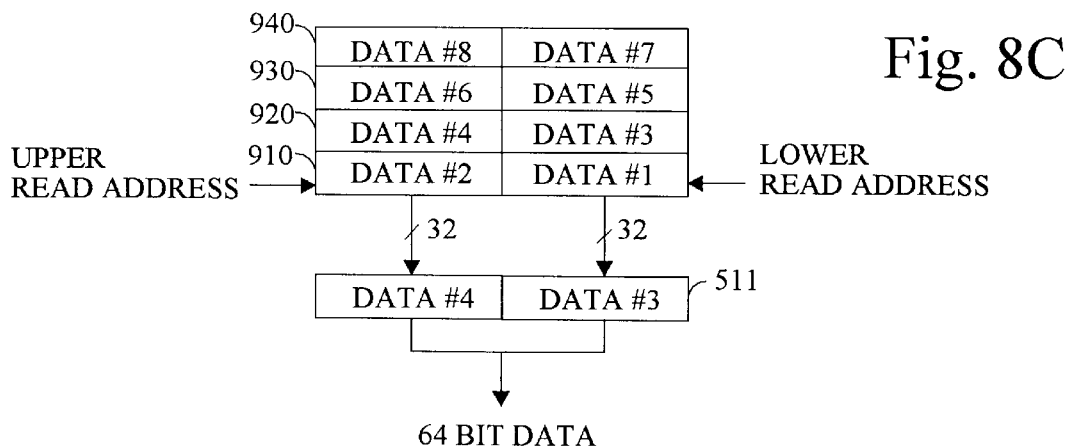

FIGS. 8A, 8B and 8C illustrate architecture and operation of SRAM 510 and register 511 of the present invention that enable access of bits located in two monochrome pixel data words to multiplexor 610 during a single clock cycle. SRAM 510 may comprise a split SRAM to store sixteen 64-bit words although only four words are shown in FIGS. 8A, 8B and 8C.

SRAM 510 of the present invention provides ability to independently access each half-word (i.e., 32 bits) within the 64-bit words. SRAM 510 may comprise an upper read address pointer and a lower read address pointer to access most significant half-words and least-significant half-words respectively of SRAM 510.

In FIG. 8A, upper read address and lower read address are shown pointing to first word 810 of SRAM 510. Accordingly, state machine 650 causes SRAM 510 to store monochrome pixel data in first word 810 in register 511. First word 810 is shown comprising data #2 (upper half-word) and data #1 (lower half-word). Multiplexor 610 receives the 64-bits stored in register 511 and provides subset of bits to color-pixel data generator 620 according to flow-chart in FIG. 7.

As multiplexor 610 completes providing subset of bits in data #1, state machine 650 may increment lower read address pointer to point to second word 820 in SRAM 510. SRAM 510 accordingly stores lower half word (data #3) of second word 820 in register 511 as shown in FIG. 8B.

Multiplexor 610 therefore receives 64-bits of monochrome pixel data comprising data #2 and data #3 once convertor 521 completes processing data #1. Hence, multiplexor 610 will have available bits (data #3) from second word 820 while processing upper half-word (data #2) of first word 810. As a result, multiplexor 610 may selectively send least significant bits of second word 820 with most significant bits of first word 810 if required by color pixel data generator 620 to generate a complete 64-bit color data word in one clock cycle. Hence convertor 521 of the present invention may generate one 64-bit word of color data per each clock cycle.

With reference to FIG. 8C, state machine 650 may increment upper address pointer after multiplexor 610 completes providing subset of bits in data #1 to color-pixel data generator 620. Such incremented pointer is shown pointing to upper half-word of second word 820. SRAM 510 accordingly stores data #4 in register 511. Register 511 therefore stores monochrome pixel data from second word 720. Hence, as color pixel data generator 620 generates pixels from lower half-word of second word 720, SRAM 510 makes available upper half-word of second word 720 also to multiplexor 610. As bits from upper half-word data #4 are available to multiplexor 610 while processing lower half-word data #3, multiplexor 610 may send least significant bits from data #4 also with most significant bits of data #3 if required for generating a 64-bit color pixel data word in a single clock cycle.

Hence, a half-word addressable split SRAM 510 of the present invention enables convertor 521 to consistently generate a 64-bit color pixel data word during each clock cycle. Once convertor 521 generates a 64-bit color pixel word, the color pixel word may be stored in OSU2 530 which may send the color pixel word to rasterop unit 570 for performing a raster operation. SRAM 512 and register 513 may also operate similar to SRAM 510 and register 511 respectively to enable convertor 530 to generate a 64-bit color pixel data word during each clock cycle.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A graphics controller circuit for converting a plurality of monochrome pixel data into a corresponding set of color pixel data, the graphics controller circuit comprising:
    a memory interface circuit for receiving the plurality of monochrome pixel data; and
    a convertor coupled to receive the plurality of monochrome pixel data from the memory interface circuit, the convertor converting each of the plurality of monochrome pixel data into a corresponding corresponding set of color pixel data, each set of color pixel data comprising groups of pixel elements, the converter packing a plurality of color pixel data sets into a plurality of color pixel words,
    wherein one element of a first color pixel data is stored in a first color pixel word and another element of the first color pixel data is stored in a second color pixel word.

2. The graphics controller circuit of claim 1 wherein each color pixel word comprises 64 bits and each color pixel data comprises 24 bits such that the converter packs an element of the first color pixel data and another two color pixel data into the first word, and another element of the first color pixel data into the second color pixel word.

3. A graphics controller circuit for converting a plurality of monochrome pixel data into a corresponding set of color pixel data, the graphics controller circuit comprising:
    a memory interface circuit for receiving the plurality of monochrome pixel data; and
    a convertor coupled to receive the plurality of monochrome pixel data from the memory interface circuit, the convertor converting the plurality of monochrome pixel data into the corresponding set of color pixel data, the converter packing a plurality of color pixel data comprised in the set of color pixel data into a plurality of color pixel words,
    wherein one portion of a first color pixel data is stored in a first color pixel word and another portion of the first color pixel data is stored in a second color pixel word, and
    wherein the memory interface circuit provides to the converter a subset of the monochrome pixel data during each clock cycle, wherein the converter generates a color pixel word from the subset of monochrome pixel data during each clock cycle.

4. The graphics controller circuit of claim 3 wherein the memory interface circuit further comprises:
    a memory for storing the plurality of monochrome pixel data; and
    a register circuit for receiving the plurality of monochrome pixel data from the memory and providing to the convertor the subset of the monochrome pixel data required for the converter to generate one color pixel word per clock cycle during each clock cycle.

5. The graphics controller circuit of claim 4 further comprising a state machine for generating control signals to the memory and the register circuit, and
    wherein the memory comprises split memory including a plurality of words for storing the plurality of monochrome pixel data, the split memory being half-word addressable, and
    wherein the register circuit stores at least two half-words of monochrome pixel data, and
    wherein the state machine causes the register circuit to replace a first half-word of the at least two half-words of monochrome pixel data stored in the register circuit with another half-word of the monochrome pixel data from the memory after the register circuit completes providing the monochrome pixel data of the first half-word to the convertor.

6. The graphics controller circuit of claim 5 wherein the convertor further comprises:
    a multiplexor coupled to the register circuit to receive the at least two half-words of monochrome pixel data stored in the register circuit, the multiplexor selectively forwarding the subset of monochrome pixel data under the control of the state machine during each clock cycle; and
    a color pixel data generator for generating a color pixel data corresponding to each of the subset of monochrome pixel data.

7. A graphics controller circuit for converting a stream of monochrome pixel data into a corresponding set of color pixel data, the graphics controller circuit comprising:
    a memory comprising a plurality of data units for storing the stream of monochrome pixel data;
    a register coupled to the memory for storing at least two data units of the stream of monochrome pixel data;
    a convertor coupled to receive the at least two data units of the stream of monochrome pixel data stored in the register, the converter converting a successive subset of the stream of monochrome pixel data to a corresponding set of color pixel data during a corresponding successive clock cycle; and
    a state machine for generating control signals to the memory and the register, the state machine causing the register to replace a first data unit of the two data units of monochrome pixel data with a subsequent data unit of monochrome pixel data in the memory after the convertor completes generating color pixel data from the first data unit such that the convertor will have available during each successive clock cycle the corresponding subset of stream of monochrome pixel data to generate corresponding color pixel data.

8. The graphics controller circuit of claim 7 wherein the memory comprises a half-word addressable split RAM comprising a plurality of words, and wherein the data unit comprises a half-word.

9. The graphics controller circuit of claim 8 wherein the convertor comprises:
    a multiplexor coupled to the register to receive the at least two half-words of monochrome pixel data stored in the register circuit, the multiplexor selectively forwarding the subset of monochrome pixel data during each clock cycle under the control of the state machine; and
    a color pixel data generator for generating a color pixel data corresponding to each of the subset of monochrome pixel data.

10. The graphics controller circuit of claim 9 wherein each word comprises 64 bits and each color pixel datum comprises 24 bits, and wherein the color pixel data generator packs eight color pixel data in three words.

11. A computer system for displaying a video image corresponding to a set of monochrome pixel data, the computer system comprising:

a frame buffer for receiving and storing the set of monochrome pixel data;

a display unit for displaying the video image corresponding to the monochrome pixel data; and a graphics controller circuit for receiving the set of monochrome pixel data and converting each of the set of monochrome pixel data into a corresponding set of color pixel data, each set of color pixel data comprising groups of pixel elements, the graphics controller circuit packing a plurality of color pixel data sets into a plurality of color pixel words, wherein one element of a first color pixel data is stored in a first color pixel word and another element of the first color pixel data is stored in a second color pixel word, the graphics controller circuit generating a set of display signals to the display unit from the plurality of color pixel words to display the video image in color.

12. The computer system of claim 11 wherein the graphics controller circuit further comprises:

a memory interface circuit for receiving the plurality of monochrome pixel data; and a convertor coupled to receive the plurality of monochrome pixel data from the memory interface circuit, the convertor converting each of the plurality of monochrome pixel data into the corresponding set of color pixel data, each set of color pixel data comprising groups of pixel elements, the converter packing the plurality of color pixel data sets into a plurality of color pixel words.

13. The computer system of claim 11 wherein each color pixel word comprises 64 bits and each color pixel data comprises 24 bits such that the converter packs an element of the first color pixel data and another two color pixel data into the first word, and another element of the first color pixel data into the second color pixel word.

14. A computer system for displaying a video image corresponding to a set of monochrome pixel data, the computer system comprising:

a frame buffer for receiving and storing the set of monochrome pixel data;

a display unit for displaying the video image corresponding to the monochrome pixel data; and a graphics controller circuit for receiving the set of monochrome pixel data and converting the set of monochrome pixel data into a corresponding set of color pixel data, the graphics controller circuit packing a plurality of color pixel data comprised in the set of color pixel data into a plurality of color pixel words, wherein one portion of a first color pixel data is stored in a first color pixel word and another portion of the first color pixel data is stored in a second color pixel word, the graphics controller circuit generating a set of display signals to the display unit from the plurality of color pixel words to display the video image in color, wherein the memory interface circuit provides to the converter a subset of the monochrome pixel data during each clock cycle, wherein the converter generates a color pixel word from the subset of monochrome pixel data during each clock cycle.

15. The computer system of claim 14, wherein the memory interface circuit further comprises:

a memory for storing the plurality of monochrome pixel data; and a register circuit for receiving the plurality of monochrome pixel data from the memory and providing to the convertor the subset of the monochrome pixel data required for the converter to generate one color pixel word per clock cycle during each clock cycle.

16. The computer system of claim 15 further comprising:

a state machine for generating control signals to the memory and the register circuit; and wherein the memory comprises split memory including a plurality of words for storing the plurality of monochrome pixel data, the split memory being half-word addressable, and wherein the register circuit stores at least two half-words of monochrome pixel data, and wherein the state machine causes the register circuit to replace a first half-word of the at least two half-words of monochrome pixel data stored in the register circuit with another half-word of the monochrome pixel data from the memory after the register circuit completes providing the monochrome pixel data of the first half-word to the convertor.

17. The computer system of claim 16, wherein the convertor further comprises:

a multiplexor coupled to the register circuit to receive the at least two half-words of monochrome pixel data stored in the register circuit, the multiplexor selectively forwarding the subset of monochrome pixel data under the control of the state machine during each clock cycle; and a color pixel data generator for generating a color pixel data corresponding to each of the subset of monochrome pixel data.

18. A method for converting a plurality of monochrome pixel data into a corresponding sets of color pixel data, the method comprising the steps of:

receiving the plurality of monochrome pixel data;

converting each of the plurality of monochrome pixel data into a corresponding set of color pixel data, each set of color pixel data comprising groups of pixel elements; and packing a plurality of color pixel data comprised in the set of color pixel data into a plurality of color pixel words, wherein one element of a first color pixel data is stored in a first color pixel word and another element of the first color pixel data is stored in a second color pixel word.

19. A method for converting a plurality of monochrome pixel data into a corresponding set of color pixel data, the method comprising the steps of:

receiving the plurality of monochrome pixel data;

converting the plurality of monochrome pixel data into the corresponding set of color pixel data;

packing a plurality of color pixel data comprised in the set of color pixel data into a plurality of color pixel words, wherein one portion of a first color pixel data is stored in a first color pixel word and another portion of the first color pixel data is stored in a second color pixel word; and providing to the step of converting during each clock cycle one of a sequence of subsets of monochrome pixel data, wherein the step of converting generates a color pixel word from the subset of monochrome pixel data received during each clock cycle.

20. The method of claim 19 further comprising the steps of:
- storing the plurality of monochrome pixel data in a plurality of data units comprised in a memory;
- retrieving monochrome pixel data from at least two of the plurality of data units;
- storing the monochrome pixel data of the two data units in a register, wherein the register stores each of the sequence of subsets of monochrome pixel data provided to the step of converting during each clock cycle;
- replacing one of the data units in the register with monochrome pixel data in a subsequent data unit in the memory after the step of providing completes providing monochrome pixel data comprised in the one of the data units such that the step of providing has available the subset of monochrome pixel data for sending during each clock cycle.

* * * * *